(12) United States Patent
Treacy et al.

(10) Patent No.: US 7,797,743 B2
(45) Date of Patent: Sep. 14, 2010

(54) FILE CONVERSION IN RESTRICTED PROCESS

(75) Inventors: Ambrose T. Treacy, Woodinville, WA (US); Maithili V. Dandige, Sammamish, WA (US); Eric Fox, Seattle, WA (US); Robert A. Little, Redmond, WA (US); Christopher C. White, Seattle, WA (US); David LeBlanc, Monroe, WA (US); Benjamin J. Bunker, Bellevue, WA (US); Aaron E. Erlandson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 871 days.

(21) Appl. No.: 11/679,068

(22) Filed: Feb. 26, 2007

(65) Prior Publication Data

US 2008/0209551 A1 Aug. 28, 2008

(51) Int. Cl.
*G06F 11/00* (2006.01)
*H04L 9/00* (2006.01)
*G06F 12/14* (2006.01)

(52) U.S. Cl. ............... 726/22; 726/24; 726/25; 726/26; 726/27; 726/28; 713/187; 713/188

(58) Field of Classification Search .......... 726/22
See application file for complete search history.

(56) References Cited

U.S. PATENT DOCUMENTS

| | | | |
|---|---|---|---|
| 5,058,000 A | 10/1991 | Cox | |
| 5,191,525 A | 3/1993 | LeBrun | |
| 5,278,978 A | 1/1994 | Demers | |
| 5,493,671 A | 2/1996 | Pitt | |
| 5,793,498 A | 8/1998 | Scholl | |
| 6,336,124 B1 | 1/2002 | Alam et al. | |
| 6,453,418 B1 | 9/2002 | Ooki | |
| 6,523,172 B1 | 2/2003 | Martinez-Guerra | |
| 6,675,373 B1 | 1/2004 | Croslin | |
| 6,778,668 B1 | 8/2004 | Nielsen | |

(Continued)

FOREIGN PATENT DOCUMENTS

JP 2005/157898 6/2005

(Continued)

OTHER PUBLICATIONS

PCT Search Report and Written Opinion for International Application No. PCT/US2008/053360.

(Continued)

*Primary Examiner*—Longbit Chai
(74) *Attorney, Agent, or Firm*—Merchant & Gould P.C.

(57) ABSTRACT

Embodiments are described for removing malicious code from a file in a first file format by converting the file into a converted file of a second file format. In embodiments, converting the file eliminates malicious code embedded within the file from being stored in the converted file. The conversion is performed within a restricted computer process that has restricted privileges limiting its access to an operating system and an underlying computer system. As a result, even if malicious code embedded within the file executes while the file is being converted into the converted file, the damage to a computer system is mitigated because of the limited privileges provided to the restricted process.

19 Claims, 6 Drawing Sheets

U.S. PATENT DOCUMENTS

| | | |
|---|---|---|
| 6,901,519 B1 | 5/2005 | Stewart et al. |
| 7,017,187 B1 | 3/2006 | Marshall |
| 7,043,634 B2 | 5/2006 | Wolff |
| 2003/0088680 A1 | 5/2003 | Nachenberg |
| 2004/0172551 A1 | 9/2004 | Fielding |
| 2004/0179220 A1 | 9/2004 | Van Oosterhout |
| 2005/0039082 A1 | 2/2005 | Nachenberg |
| 2005/0235164 A1 | 10/2005 | Gassoway |
| 2006/0010495 A1 | 1/2006 | Cohen |

FOREIGN PATENT DOCUMENTS

| | | |
|---|---|---|
| WO | WO2006/038987 | 4/2006 |
| WO | WO2006043233 | 4/2006 |

OTHER PUBLICATIONS

Cisco, ASA 5500 Series Adaptive Security Appliances; http://www.cisco.com/application.pdf/en/us/guest/products/ps6120/c1031/cdccont_0900aecd80285492.pdf.

Host and Network Intrustion Prevention; http://www.mcafee.conrdus/local_content/white_papers/wp_host_nip.pdf.

Computer Security Incident Handling Guide; http://csrc.nist.gov/publications/nistpubs/800-61/sp800-61.pdf.

Inter-organizational Document Exchange—Facing the Conversion Problem with XML. http://www.is.tu-darmstadt.de/download/inter-organizational_document_exchange.pdf.

SCOPE—An XML based publishing platform. http://adt.caul.edu.au/etd2005/papers/110Bishop.pdf.

Epic: Single Source Publishing with XML. http://www.idealliance.org/papers/xml02/dx_xml02/papers/04-06-03/04-06-03.pdf.

Why Use XML for Documents & Content? http://www.datawarehouse.com/iknowledge/whitepapers/CID3443.pdf.

FILE CONVERSION IN RESTRICTED PROCESS

BACKGROUND

Dealing with malicious code such as viruses and Trojan horses is a constant concern for software developers. Hackers are generally taking advantage of vulnerabilities within an application or file format as soon as the vulnerability becomes known. Malicious code that takes advantage of a known vulnerability on the same day that the vulnerability becomes generally known is referred to as a zero day exploit. To date, there are very few solutions that effectively deal with zero day exploits.

Because of the speed with which the malicious code can be circulated in a zero day exploit, developers do not have enough time to implement a patch or other solution to deal with the vulnerability. Frequently, the only solution available is to reduce the potential for opening malicious code by encouraging users to follow security best practices such as turning off unneeded services, keeping patch levels up to date, and avoiding opening attachments that are from unknown sources or are unexpected. Once a vulnerability becomes known, a user can avoid opening files that are affected by the vulnerability. However, this does not provide an adequate solution in cases where a user must access the file.

Moreover, currently available software applications (e.g., anti-virus software) used to search and eliminate malicious code must have some previous knowledge of the malicious code or vulnerability being exploited. For example, some applications search documents for code that has been previously identified as malicious. Other applications require knowledge about the vulnerability, such as a particular field in a structure that should be searched for unusual code. Each of these methods requires prior knowledge (of code or the vulnerability). In a zero day exploit, the vulnerability will not be known, and hackers generally create new code that will not be identified as malicious. This makes currently available software applications ineffective against zero day exploits.

It is with respect to these and other considerations that embodiments of the present invention have been made. Also, although relatively specific problems have been discussed, it should be understood that embodiments of the present invention should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Embodiments are described for removing or making ineffective malicious code from a file in a first file format by converting the file into a converted file in a second file format. In embodiments, malicious code that is contained within the file is removed or made ineffective during the conversion of the file into the converted file. The conversion is performed by a converter, which is loaded within a restricted computer process. The computer process has restricted privileges that limit its access to the underlying operating system and computer system. Accordingly, even if malicious code embedded within the file manages to execute during the conversion, it is limited in the damage that it can cause, because it is loaded within the restricted process.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

As briefly described, embodiments are directed to removing or making ineffective malicious code from a file in a first file format by converting the file into a second file format. The malicious code is removed or rendered ineffective without any prior knowledge of the code, or the vulnerability being used to carry the code. The conversion is performed by a converter, which is loaded within a restricted computer process. The computer process has restricted privileges that limit its access to the underlying operating system and computer system. Accordingly, even if malicious code embedded within the file manages to execute during the conversion, it is limited in the damage that it can create, because of the restricted access. In the present application, the term "malicious code" is intended to be broad and include software that is included in a file or application for an unauthorized purpose. Examples of malicious code include viruses, worms, trojan horses, and other unwanted software.

Figure 1:
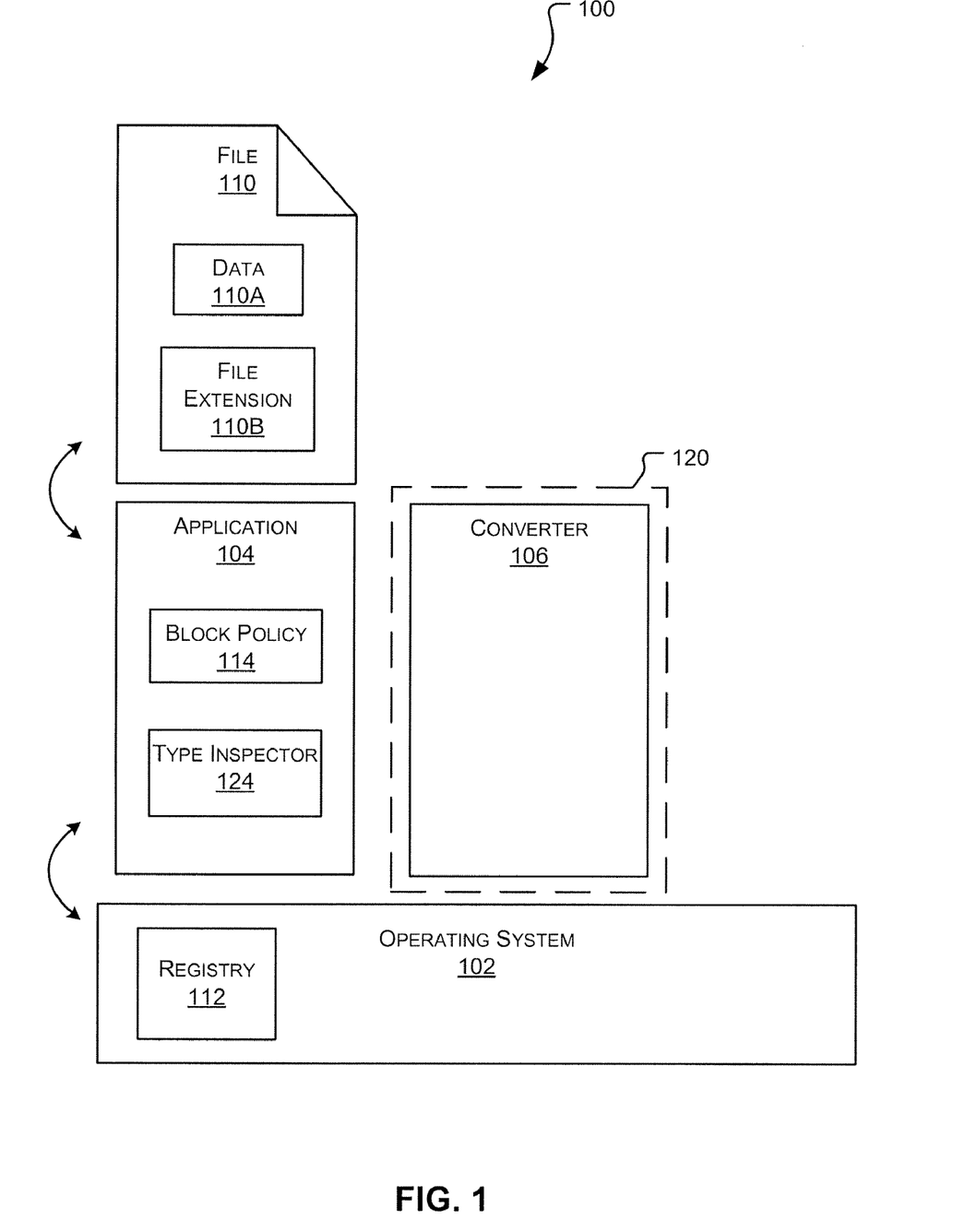
FIG. 1 illustrates a system that is used to remove or make ineffective malicious code from a file, according to an embodiment.

FIG. 1 illustrates a system 100 that is used to safely open a file that may contain malicious code, according to an embodiment. In this embodiment, system 100 includes operating system 102 with a registry 112, application 104, converter 106, and a file 110. File 110 includes data 110A and a file extension 110B (e.g., as part of the file name). Further, in accordance with this embodiment, application 104 includes a block policy 114. The block policy 114 in some embodiments indicates which types of files (i.e., file formats) are blocked from being opened by application 104. In addition, the block policy 114 can also indicate which file types are blocked from being saved. Block policies and their use in blocking the opening and/or saving of a file are discussed in detail in U.S. patent application Ser. No. 11/679048 entitled "FILE BLOCKING MITIGATION", which is co-owned and filed on the same date as the present application and is hereby incorporated by reference in its entirety.

Converter 106 is used to convert files from a first file format into a second file format. Converting files from the first file format into the second file format removes, or renders ineffective malicious code that may be embedded within the files. Converter 106 can communicate with operating system 102 for purposes such as accessing operating system functions. In the embodiment shown in FIG. 1, converter 106 is loaded into a restricted process 120, so that the conversion of files from a first file format into the second file format is performed within restricted process 120. Restricted process 120 has limited access privileges to operating system 102, and the underlying computer system on which operating system 102 is executing. In other words, process 120 has limited privileges to request operating system functions.

Referring now to application 104, it can communicate with operating system 102 for purposes such as accessing operating system functions. In the embodiment shown in FIG. 1, application 104 is not within a restricted process like converter 106, and therefore has greater privileges to request operating system functions. In addition, application 104 can open, edit, save, and/or create files. In the embodiment shown in FIG. 1, application 104 is interacting with file 110. As one example, application 104 may be a word processing application. A user can launch application 104 and then open a file (e.g., file 110) with application 104, which loads file 110 into memory and provides access to the file. The user can then add and edit data (i.e., data 110A) in file 110. Application 104 are not limited to a specific type of application, but may be any kind of application, such as word processing, spreadsheet, graphic presentation etc.

Application 104, in embodiments, also sets file extension 110B to indicate that file 110 is of a particular type. For example, in this embodiment file extension 110B is part of the file name of file 110 assigned to the file when the file is "saved" or "saved-as." For example, a word processing application can cause a file (e.g., a text document) to have a file extension of ".doc" to indicate that the file is of a binary file format.

File extensions, such as 110B, are sometimes used by administrators for detecting or blocking potentially malicious files (i.e., files with a known vulnerability that can be exploited to introduce malicious code) before they are received by a network. For example, an email server can be configured to detect and block all email with files having a particular file extension, while allowing email with files having other file extensions to enter the email client network. However, because file extensions can be easily manipulated by simply renaming a file with a different extension, the use of file extensions is not a trustworthy mechanism for identifying files with malicious code from being introduced into a network. Moreover, blocking a file before it enters a network prevents a user, who is expecting the file, from knowing that the file was blocked and/or that there is a security issue with the file.

In the embodiment shown in FIG. 1, application 104 includes type inspector module 124. Type inspector module 124 examines file data (e.g., 110A) and determines a true file format of a file. The term "true file format" is used in this application to describe the actual format of a file. As one example, a word processing document may have a file format of *.doc; *.dot; or *.wiz. It should be understood that in the embodiment shown in FIG. 1, the true file format of a file is not determined by inspecting a file extension such as extension 110B. Rather, type inspector module 114 examines a portion of file data e.g., 110A, and based on the examination determines the true file format of a file.

In one embodiment, type inspector module 124 reads the first few bytes of data from a file (i.e., sniffs the file), and based on such features as header information and data structures within the examined data, the type inspector module 124 can determine a file's true file format. A true file format is described in the present application using a file extension. For example, a file format may be described as *.doc; *.dot; and/or *.wiz. However, describing a true file format as a file extension should not be confused with determining a true file format, which does not involve examining the file extension.

In operation, system 100 first launches an application, such as application 104. The launching of application 104 may occur by a user requesting the launch of application 104, for example by double-clicking on an icon representing application 104. Alternatively, a user may request that file 110, be opened by for example double-clicking on an icon of the file 110. In this case operating system 102 may associate file extension 110B with application 104 and initiate the launch of application 104.

Application 104 loads configuration information when launched. In some embodiments the configuration information is stored in a registry 112 of operating system 102. In these embodiments, when application 104 launches, it will request the configuration information from operating system 102, which will retrieve the information from registry 112. In one embodiment, block policy 114 is stored as configuration information within the registry of operating system 102; for example in the form of registry keys. Accordingly, when application 104 launches, it will retrieve block policy 114 from registry 112.

In some embodiments, access to block policy 114 is limited to those users with the privilege to write/modify registry 112, for example users with administrative privileges. Therefore, an administrator can effectively control the file formats that are blocked from being opened or saved using application 104.

Once launched, application 104 can be used to open, edit, and save files. As a first example, when application 104 attempts to open file 110, type inspector module 124 first examines a portion of data 110A to determine a true file format of file 110. As described above, in an embodiment type inspector module 124 determines the true file format by examining the first few bytes of data 110A. Type inspector module 124 may use header information or data structures within data 110A to make the determination as to the true file format of file 110. Once the true file format of file 110 has been determined, application 104 compares the true file format to block policy 114. If the true file format of file 110 is not identified by block policy 114 as blocked from being opened, application 104 will open file 110 by loading the file into memory and providing file access to a user to add, edit, and save data in file 110.

If the true file format of file 110 is identified by block policy 114 as blocked from being opened, application 104 will block the open of file 110. In one embodiment, application 104 displays a message to a user indicating that the file is of a file format that is blocked from being opened.

In another embodiment, in response to a determination that file 110 is blocked from being opened, converter 106 may be launched to convert the file from its true file type to a second file type that is not blocked from being opened. In this embodiment, converter 106 is loaded into restricted process 120 and is used to convert file 110 into a second file that is not blocked from opening by application 104.

In some embodiments of system 100, an administrator may set converter 106 as the default handler for a file of a specific file format. In the event of a zero day exploit, where a particular file format has been identified as vulnerable, an administrator can mitigate possible damage to a computer system or network by setting the converter 106 as the default handler for files of the vulnerable format. This reduces the likelihood of damage during the zero day exploit, because any time a user attempts to open a file stored in the vulnerable file format, converter 106 will be launched to convert the file into another format. As described above, the conversion will eliminate malicious code from being transferred/stored in the converted file. Moreover, because converter 106 is loaded into restricted process 120, any malicious code that does execute will have limited impact on a computer system or network.

With some embodiments, an administrator can take additional precautions during a zero day exploit by setting a block policy for application 104 to block files of the vulnerable format. Accordingly, in combination with setting converter 106 as the default handler, a computer system or network has robust protection against damage that may be caused by malicious code included in a file of the vulnerable format.

Figure 2:
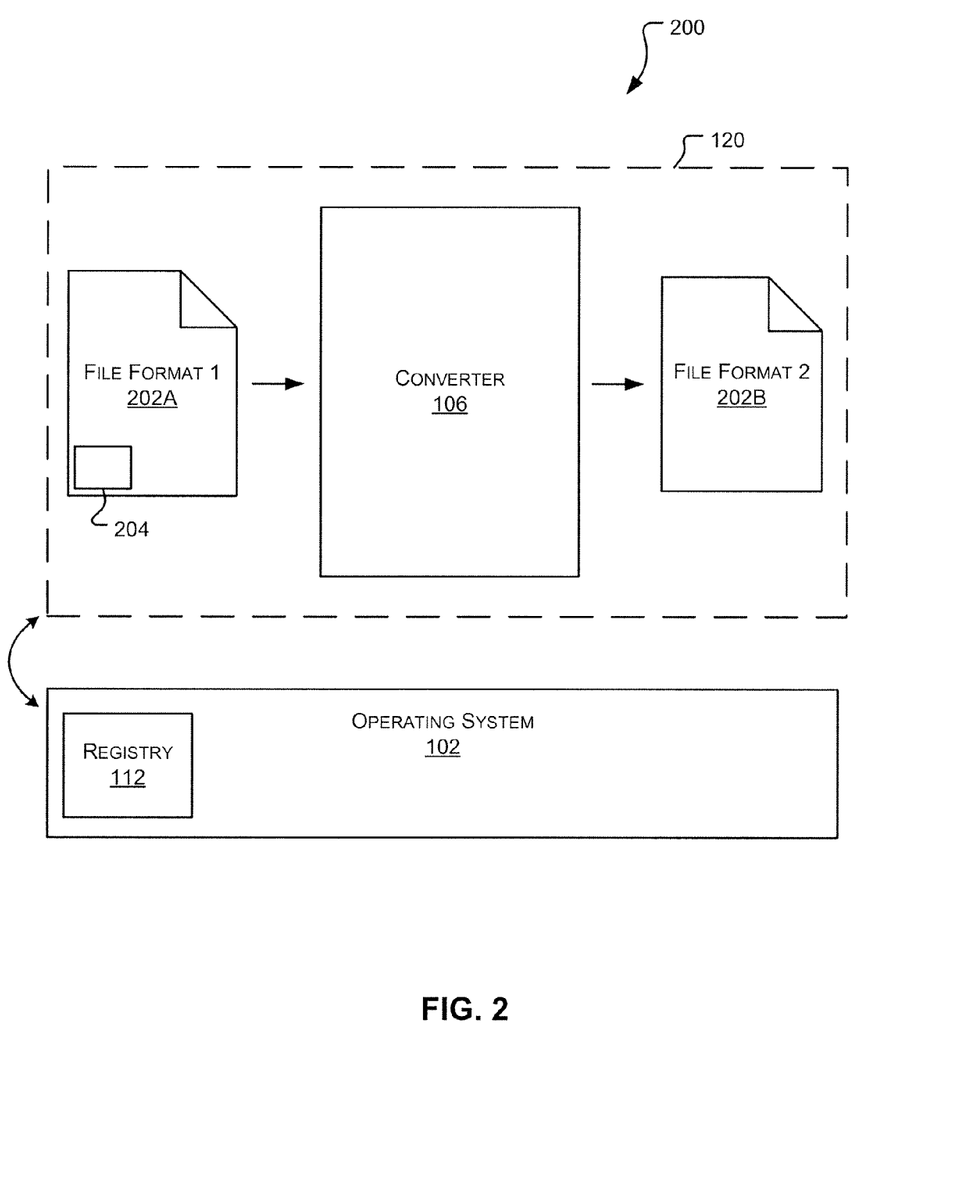
FIG. 2 illustrates a system that may be used to safely open a file that may contain malicious code, according to an embodiment.

FIG. 2 illustrates a system 200 with a more detailed depiction of converter 106. System 200 includes file 202A, which is in a first file format (file format 1), converter 106, converted file 202B, which is in a second file format (file format 2), and operating system 102 with registry 112. In the embodiment shown in FIG. 2, converter 106 is loaded into a restricted process 120, so that a conversion from file format 1 into file format 2 is performed within restricted process 120. Restricted process 120 has limited access privileges to operating system 102, and the underlying computer system on which operating system 102 is executed. This ensures that even if malicious code, such as malicious code 204 executes, it is limited in the damage that it can do to operating system 102 and the underlying computer system. FIG. 2 shows the details of an embodiment of converter 106, which converts a file 202A of a first file format into a converted file 202B of a second file format, and in the process removes or makes ineffective malicious code 204 from the converted file data.

In operation, system 200 first launches converter 106. The launching of converter 106 may occur by a user requesting the launch of converter 106, for example by double-clicking on an icon representing converter 106. Alternatively, a user may request that file 202A be opened by for example double-clicking on an icon of file 202A. In this case operating system 102 may associate file 202A (or its file extension) with converter 106 and initiate the launch of converter 106.

Converter 106 loads into restricted process 120 when launched. When launched, converter 106 may load configuration information from registry 112. The configuration information may include information that indicates the specific mechanism by which process 120 is restricted. Process 120 has limited access privileges to operating system 102, and the underlying computer system on which operating system 102 is executing. As those of skill in the art will appreciate, the specific restrictions placed on process 120, and the mechanism by which process 120 is restricted, will vary depending on the specific operating system 102, and by other design considerations such as the level of risk attributed to file 202A.

In some embodiments, process 120 is denied permission to perform particular operations and/or or make calls to specific functions of operating system 102. For example, process 120 is denied permission to read or write information to the registry 112 of operating system 102 because registry 112 stores sensitive configuration information for various applications. However, process 120 is allowed to read and write data to other storage locations. In other embodiments, process 120 is restricted to performing only those functions that are necessary for converting a file from file format 1 to file format 2. For example, process 120 is allowed only to read data from the file that is being converted (e.g., file 202A), and to write data to the converted file (e.g., file 202B) with the converted information in file format 2.

As described above, the mechanism by which process 120 is restricted will depend on the specific operating system 102. In one embodiment, operating system 102 is a version of the "WINDOWS" operating system which provides a number of ways to limit the access privileges of a process. For example, in versions of the "WINDOWS" operating system every process has an associated access token, which describes a security context of the process including a list of the system-wide privileges for the process. An access token that typically describes a restricted security context is called a restricted token. A restricted token describes a limited set of system-wide privileges. In one embodiment, process 120 is restricted by being associated with a restricted token that describes a limited set of system-wide privileges.

In other embodiments of system 200 that use a version of the "WINDOWS" operating system, process 120 may be restricted by being associated with a job object. A job object allows groups of processes to be managed as a unit. Job objects control attributes of the processes associated with them. A job object can be used to enforce limits on an associated process, such as working set size, process priority, and end-of-job time limit. In an embodiment, process 120 is restricted by being associated with a job object that enforces predefined limits for process 120.

In other embodiments, process 120 may be restricted using a desktop container or window station. Versions of the "WINDOWS" operating system provide desktop containers to allow a number of users to log onto a window station. A desktop container is a secured container object that is contained within a window station. A desktop container is a logical collection of user interface elements, which is in turn contained by a window station, as implemented by versions of the "WINDOWS" operating system. Certain aspects of communication between processes running within versions of the "WINDOWS" operating system are regulated on the basis of whether the processes are assigned to the same desktop, and in some cases, communication is regulated by whether the processes share the same window station. The inter-process communications may have security implications, and for this reason, in some embodiments the restricted process 120 runs in a separate window station (which implies a separate desktop, since all desktops have only one window station as a container).

In embodiments of system 200 implemented using a "WINDOWS" operating system, process 120 is restricted using a combination of restricted tokens, job objects, and window stations/desktop containers. The use of two or more of these mechanisms provides robust security that limits the damage that may be caused by malicious code executing in process 120 during the conversion of file 202A from file format 1 into converted file 202B in file format 2. In one specific embodiment, process 120 is restricted using all three of a restricted token, a job object, and a desktop container.

After converter 106 is loaded into restricted process 120, converter 106 converts file 202A from file format 1 into converted file 202B in file format 2. As described above, the converter does not have any knowledge of malicious code 204 that may be within file 202A, nor does it have knowledge of the vulnerability. In embodiments, converter 106 converts file 202A using a parser and an engine. The parser parses the file to extract data, which is expressed by the engine in the different file format, namely file format 2. The newly expressed data is stored in converted file 202B. In an embodiment, during the process of parsing file 202A, the parser identifies features within file 202A, such as header information and data structures of file 202A, which it uses to determine what data it will transfer into converted file 202B. Malicious code 204 does not include the features used by converter 106 to determine the data to store in converted file 202B, and therefore is not included in converted file 202B. When the parser of converter 106 parses malicious code 104, it will not recognize the necessary features to transfer the data into file 202B. Accordingly, the malicious code 204 will be eliminated from the file data transferred into converted file 202B. Converted file 202B can then be safely opened and accessed outside of restricted process 120.

In other embodiments, the malicious code 204 may be passed through to converted file 202B. Applications typically use a parser to scan a file prior to opening the file. Often, malicious code, such as malicious code 204 targets parsers designed to open files of a specific file format. That is, malicious code 204 may target parsers used to open files in file format 1. Thus, even if malicious code 204 is included in converted file 202B, it will not pose much of a security threat, because converted file 202B will be opened by parsers designed to open files of file format 2. Thus, in embodiments, simply converting file 202A in file format 1 to converted file 202B in file format 2 eliminates the threat of malicious code 204 even if the code is included in converted file 202B.

In some situations, malicious code 204 may attack converter 106 when converter 106 attempts to convert file 202A. As described in detail above, converter 106 runs in restricted process 120, which has restricted privileges. Accordingly, even if malicious code 204 manages to execute successfully during conversion of file 202A, it will be limited in the damage that it may cause.

In embodiments, the conversion performed by converter 106 provides advantages over software applications which are designed specifically to remove malicious code from files. Typically, those applications that are designed to remove malicious code must have some knowledge, such as features to look for to identify the malicious code or structures to examine that may be vulnerable to storing malicious payloads. In contrast, converter 106 does not have any knowledge of malicious code 204, rather the mere fact that the malicious code 204 does not contain the characteristics necessary for converting the data from file format 1 into file format 2 will remove the malicious code 204 from the data transferred into converted file 202B. Moreover, even if malicious code 204 is transferred into converted file 202B, it does not pose a serious security threat, because of the new file format (e.g., file format 2) of converted file 202B.

In some embodiments, converter 106 is a two-way converter which means that it can convert file format 1 into file format 2 and also convert file format 2 back to file format 1. In one embodiment, after converter 106 has generated converted file 202B and removed malicious code 204 from being transferred into converted file 202B, it converts file 202B back to file format 1. In one example, file 202A may be in a binary file format (file format 1) that has been identified as having a security vulnerability. As a result, file 202A is converted by converter 106 into converted file 202B in an XML file format (file format 2), which removes or renders ineffective malicious code 204. However, a user may not have an application that is capable of opening files that are in an XML format. Thus, file 202B is then converted back to the binary file format (file format 1) in order to allow a user to open and access the file data.

Figure 3:
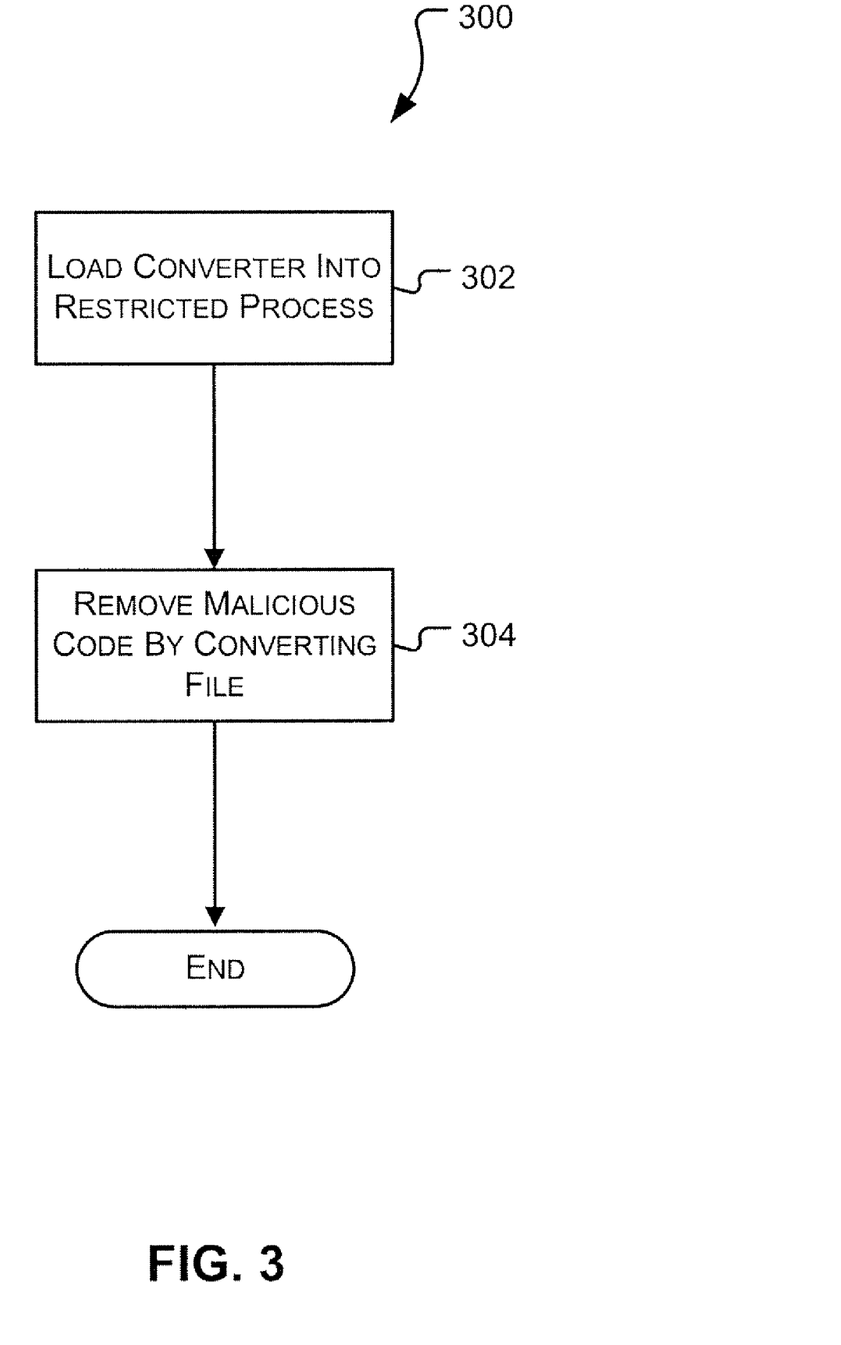
FIG. 3 illustrates an operational flow for removing or rendering ineffective malicious code from a file.
Figure 4:
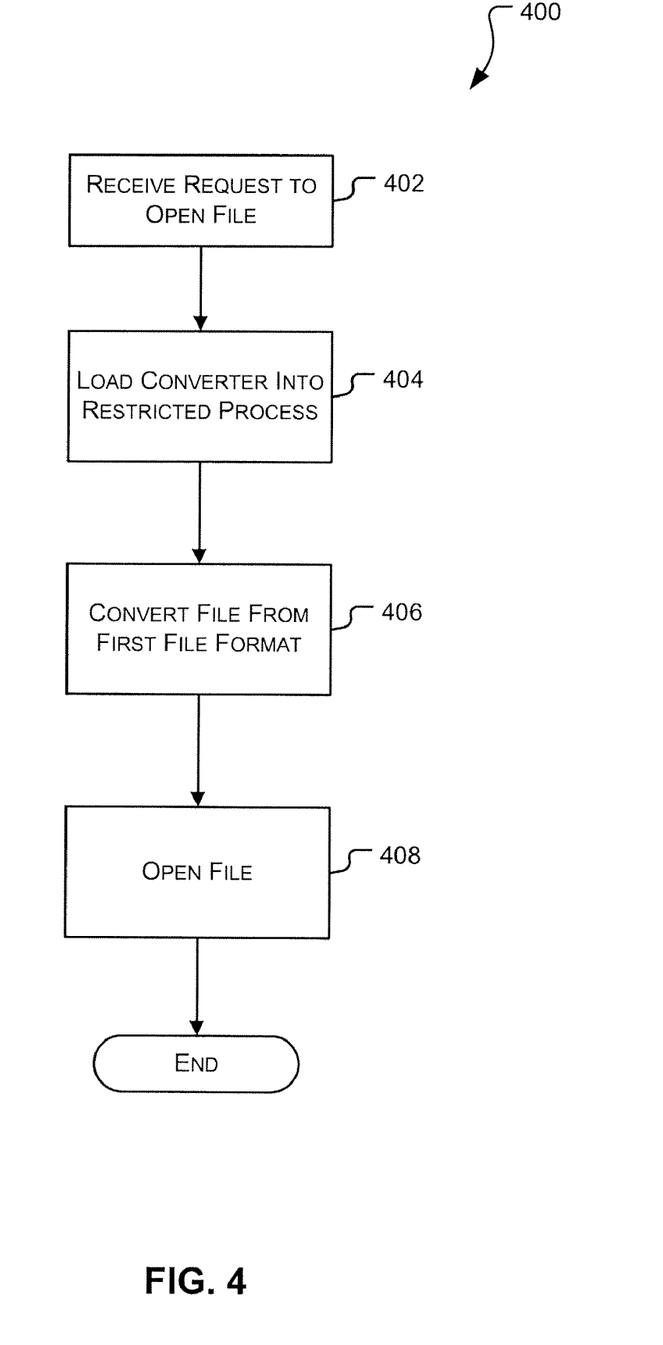
FIG. 4 illustrates an operational flow for safely opening a file that may contain malicious code.
Figure 5:
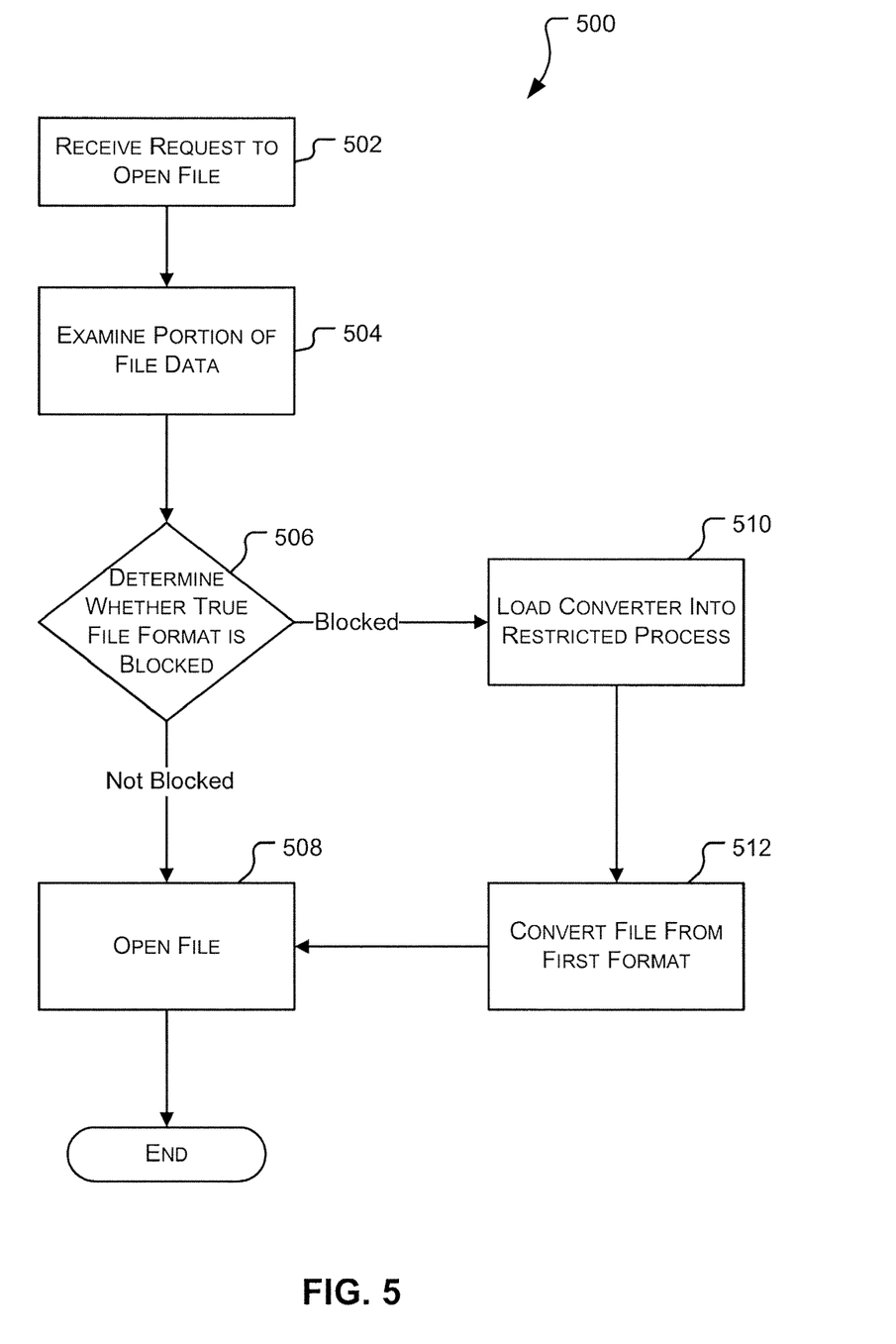
FIG. 5 illustrates a second operational flow for safely opening a file that may contain malicious code.

FIGS. 3-5 illustrate operational flows 300, 400, and 500, according to embodiments. Operational flows 300, 400, and 500 may be performed in any suitable computing environment. For example, the operational flows may be executed by a system such as systems 100 and 200 (FIG. 1 and FIG. 2) to remove malicious code from a file and securely open the file. Therefore, the description of operational flows 300, 400, and 500, may refer to at least one of the components of FIG. 1 and FIG. 2. However, any such reference to components of FIG. 1 and FIG. 2 is for descriptive purposes only, and it is to be understood that the implementations of FIG. 1 and FIG. 2 are a non-limiting environment for operational flows 300, 400, and 500.

Furthermore, although operational flows 300, 400, and 500 are illustrated and described sequentially in a particular order, in other embodiments, the operations may be performed in different orders, multiple times, and/or in parallel. Further, one or more operations may be omitted or combined in some embodiments.

FIG. 3 illustrates an operational flow 300 for removing malicious code from a file, according to one embodiment. At operation 302, a converter which is capable of converting a file from a first format to a second format, is loaded into a restricted process. In embodiments, the converter is converter 106 (FIG. 1 and FIG. 2), which is loaded into restricted process 120 (FIG. 1 and FIG. 2). Restricted process 120 has limited privileges to access an operating system, such as for example operating system 102. The restrictions placed on the process limit the possibility of damage created by malicious code that is executed during conversion of a file by the converter.

Operation 302 may be initiated as a result of a user requesting the launch of a converter, for example by double-clicking on an icon representing the converter. Alternatively, a user may request a specific file be opened by for example double-clicking on an icon of the file, and in response operation 302 will initiate the launch of the converter by loading the converter into a restricted process.

After converter has been loaded into a restricted process, operational flow passes to operation 304, where malicious code is removed by converting the file from a first format into a second format. Operation 304 is performed within the restricted process. In one embodiment, the conversion is performed by the converter 106 in restricted process 120. As described above, converter 106 will parse a file in a first file format and identify features within the file that are used to extract data from the file. The extracted data is then stored in a converted file that is in a second file format. The converted file is free of any malicious code that may have been embedded in the first file. The converted file can then be safely opened in a process with less restrictions than the restricted process used in converting the file.

FIG. 4 illustrates an operational flow 400 for securely opening a file to access the data in the file, according to one embodiment. At operation 402 a request to open a file is received. In one embodiment, the request is received by a converter such as converter 106 (FIG. 1 and FIG. 2). For example, a user may attempt to open a file by launching a converter and then selecting the file through the converter. In another embodiment, the request is received by an application such as application 104 (FIG. 1). A user may attempt to open a file by launching the application and then selecting the file. In some embodiments the request is received when a user selects a file, such as by double-clicking on an icon of the file.

Operational flow then passes to operation 404, where a converter which is capable of converting a file from a first format to a second format, is loaded into a restricted process. In embodiments, the converter is converter 106 (FIG. 1 and FIG. 2), which is loaded into restricted process 120 (FIG. 1 and FIG. 2). The restricted process has limited privileges to request functions from an operating system, and to access resources in an underlying computer system. This mitigates the damage that may be caused by malicious code executing within process 120.

At operation 406, the converter converts a file from the first file format to generate a second file that is in a second file format. In embodiments, the process of converting the file eliminates any malicious code that may have been embedded within the file from being stored in the second file. The elimination of malicious code occurs without any knowledge of the malicious code, or any knowledge of a vulnerability being exploited by the malicious code. In other embodiments, any malicious code within the file may be rendered ineffective by simply converting the file from the first file format to the second file format. In embodiments, the converter is converter 106 (FIG. 1 and FIG. 2) which parses the file to extract data from the file and store in the second file.

After operation 406, flow passes to operation 408, where the file is opened. In embodiments, operation 408 involves launching an application that is capable of opening and providing access to the converted file which is in the second file format. In other embodiments, operation 408 may involve a number of additional operations, such as converting the converted file a second time. For example, the converter used in operation 406 may be a two way converter which can convert files from the first file format into the second file format, and also convert files in the second file format into the first file format. In one embodiment, operation 408 involves converting the file in the second file format back to the original first file format, using the converter. This operation can then be followed by the launch of an application capable of opening the file in the first file format.

In other embodiments, another converter may be used to convert a file from the second file format into a third file format. In this embodiment, operation 408 may involve launching a second converter which converts the file in the second file format into a third file format. This operation can then be followed by the launch of an application capable of opening and providing access to the file in the third file format.

FIG. 5 illustrates an operational flow 500 for securely opening a file, according to one embodiment. At operation 502 a request to open a file is received. In one embodiment, the request is received by an application such as application 104 (FIG. 1). For example, a user may launch an application and then select the file. In some embodiments a user selects a file, which may automatically launch an appropriate application to open the file (or prompt the user to select an application to open the file).

At operation 504 file data from the file is examined to determine a true file format. In one embodiment, an application having a type inspector module, such as type inspector module 124 (FIG. 1), is used to inspect file data before the file is loaded into memory. The file data inspected by the type inspector module is only a small fraction of the data within the file. By identifying features within the data such as header information and data structures, the type inspector module can make a determination as to the true file format without the need to examine all of, or a large part of, the data within the file.

At operation 506 a determination is made as to whether the true file type for the file is blocked from being opened. In embodiments, the determination is made by accessing a block policy, such as block policy 114A (FIG. 1), which indicates which file formats have been blocked from opening. If at operation 506, a determination is made that the true file format is not blocked then flow passes to operation 508 where the file is opened by loading the file into memory and providing access to the file. For example, in one embodiment an application, such as application 104, performs operation 508 by loading the file into memory and providing access to a user through the application, to allow the user to edit, add, and save data in the file.

If at operation 506, a determination is made that the true file format of the file is blocked from opening, flow passes to operation 510. At operation 510, a converter which is capable of converting a file from a first format to a second format, is loaded into a restricted process. In embodiments, the converter is converter 106 (FIG. 1 and FIG. 2), which is loaded into restricted process 120 (FIG. 1 and FIG. 2). The restricted process has limited privileges to request functions from an operating system and to access resources in an underlying computer system. The limited privileges mitigate the damage that may be caused by malicious code executing within process 120.

At operation 512, the converter loaded into the restricted process converts a file from the first file format to generate a second file that is in a second file format. In some embodiments, the process of converting the file eliminates any malicious code that may be embedded within the first file from being included in the second file. The elimination of malicious code occurs without any knowledge of the malicious code, or any knowledge of a vulnerability being exploited by the malicious code. In other embodiments, simply converting the file from the first file format to the second file format eliminates the risk from malicious code that targets parsers used to open files in the first file format. In embodiments, converter is converter 106 (FIG. 1 and FIG. 2) which parses the file in a first file format and identifies features within the file that are used to extract data from the file. The extracted data is then stored in the second file that is in a second file format. The second file is free of any malicious code that may have been embedded in the first file.

After operation 512, flow passes to operation 508, where the converted file is opened. In embodiments, operation 508 involves launching an application that is capable of opening and providing access to the converted file which is in the second file format. In other embodiments, operation 508 may involve a number of additional operations, such as converting the converted file a second time.

Figure 6:
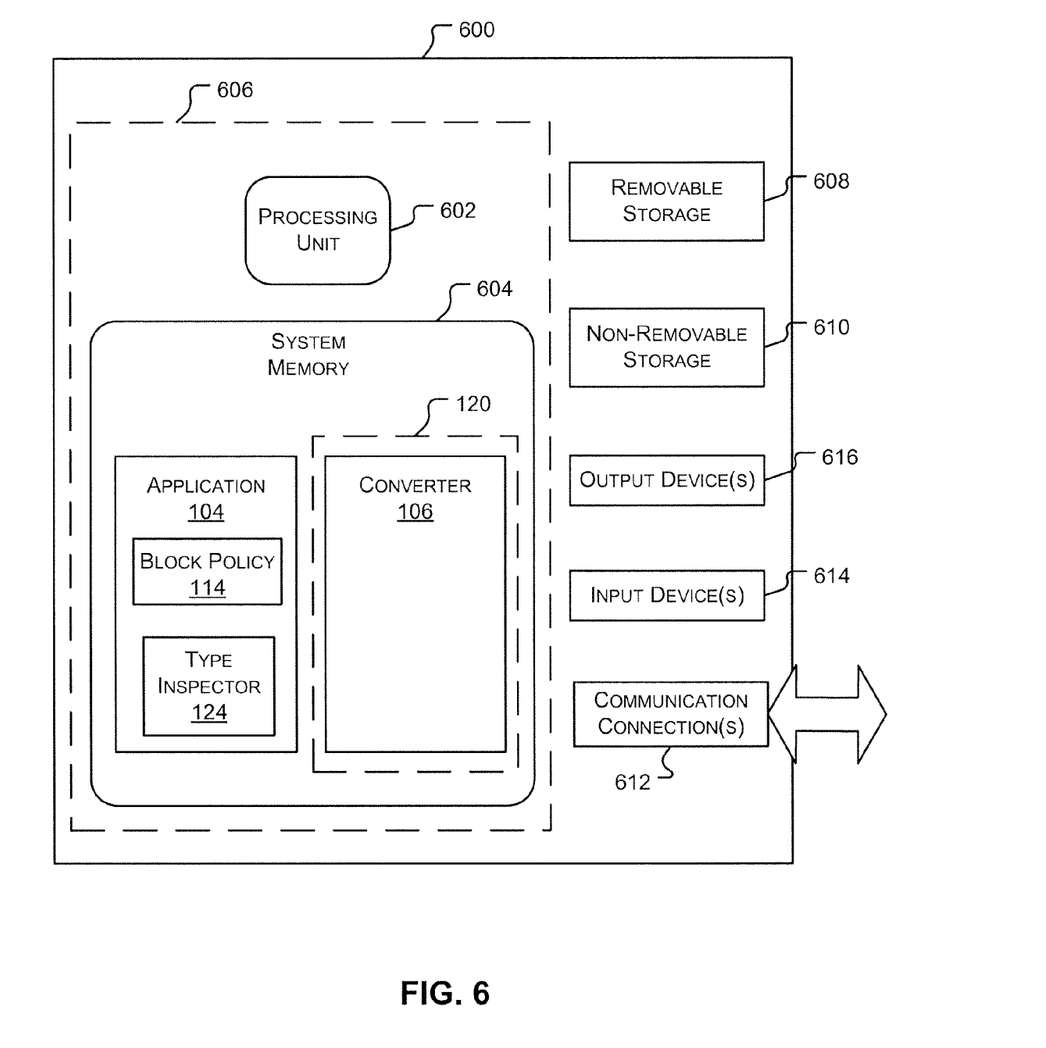
FIG. 6 illustrates a block diagram of a computing environment suitable for implementing embodiments.

FIG. 6 illustrates a general computer environment 600, which can be used to implement the embodiments described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

In its most basic configuration, system 600 typically includes at least one processing unit 602 and memory 604. Depending on the exact configuration and type of computing device, memory 604 may be volatile (such as RAM), nonvolatile (such as ROM, flash memory, etc.) or some combination of the two. This most basic configuration is illustrated in FIG. 6 by dashed line 606. As shown in FIG. 6, applications, such as application 104 (FIG. 1) including block policy 114 and type inspector module 124 may be loaded into system memory 604 for use by a user of system 600. FIG. 6 also shows the restricted process 120 into which converter 106 is loaded to convert a file from a first format to a converted file in a second format to remove malicious code that may be embedded within the file.

Additionally, system 600 may also have additional features/functionality. For example, system 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 600. Any such computer storage media may be part of system 600.

System 600 may also contain communications connection(s) 612 that allow the system to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 600 may also have input device(s) 614 such as keyboard, mouse, pen, voice input device, touch input device, etc. Output device(s) 616 such as a display, speakers, printer, etc. may also be included. All these devices are well know in the art and need not be discussed at length here.

Reference has been made throughout this specification to "embodiment," "one embodiment," "an embodiment," "another embodiment," and "some embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A method of removing malicious code from a file of a first file format, the method comprising:
configuring at least one processor to perform the functions of:
in response to a request to open the file, loading into a restricted process a converter capable of converting the file from the first file format to a second file format so as to limit damage caused by malicious code during the conversion of the file and wherein the converter within the restricted process has limited access privileges to an operating system; and
removing malicious code using the converter loaded in the restricted process to convert the file from the first file format into a converted file of the second file format; and
opening the converted file after the converting.

2. The method of claim 1, wherein the converter is designated as the handler for all files of the first file format.

3. The method of claim 1, wherein the restricted process has limited privileges to request functions from an operating system.

4. The method of claim 3, wherein the restricted process is limited to reading data from the file and writing data into the converted file.

5. The method of claim 3, wherein the restricted process has limited privileges based on one of the group consisting of a restricted token, a job object, a desktop container, and a combination thereof.

6. The method of claim 1, further comprising after the removing, converting the converted file into a third file format.

7. The method of claim 6, wherein the converting the converted file is performed by the converter and the third file format is the same as the first file format.

8. A computer readable storage medium storing computer instructions executed upon access by a processor, wherein the computer readable storage media does not consist of a propagated data signal, wherein the instructions when executed perform a method of opening a file, the method comprising:
receiving a request to open a file of a first file format;
loading into a restricted process a converter capable of converting the file from the first file format to a second file format so as to limit damage caused by malicious code during the conversion of the file and wherein the converter within the restricted process has limited access privileges to an operating system;

converting the file from the first file format into a converted file in the second file format using the converter loaded in the restricted process, wherein the converting eliminates any malicious code present in the file from the converted file and after the converting, opening the converted file.

9. The computer readable storage medium of claim 8, wherein the converter is designated as the handler for all files of the first file format.

10. The computer readable storage medium of claim 8, wherein the restricted process has limited privileges to request functions from an operating system.

11. The computer readable storage medium of claim 10, wherein the restricted process is limited to reading data from the file and writing data into the converted file.

12. The computer readable storage medium of claim 10, wherein the restricted process has limited privileges based on one of the group consisting of a restricted token, a job object, a desktop container, and a combination thereof.

13. The computer readable storage medium of claim 8, wherein the opening further comprises launching an application capable of opening the converted file in the second file format.

14. The computer readable storage medium of claim 13, wherein the opening further comprises converting the converted file into a third file format.

15. A method of opening a file, the method comprising:
configuring at least one processor to perform the functions of:
receiving a request to open a file;
examining a portion of the file's data to determine a true file format for the file;
determining whether the true file format is of a format that is blocked from being opened;
in response to a determination that the file format is not of a format that is blocked, opening the file; and
in response to a determination that the file format is of a format that is blocked:
loading into a restricted process a converter capable of converting the file from the first file format to a second file format so as to limit damage caused by malicious code during the conversion of the file and wherein the converter within the restricted process has limited access privileges to an operating system;
converting the file from the first file format into a converted file in the second file format using the converter loaded in the restricted process, wherein the converting eliminates malicious code present in the file from the converted file; and
after the converting, opening the converted file.

16. The method of claim 15, wherein the determining comprises accessing an open block policy indicating the format that is blocked from being opened.

17. The method of claim 16, wherein the open block policy is stored in a registry of an operating system.

18. The method of claim 17, wherein the restricted process has limited privileges to request functions from the operating system.

19. The method of claim 18, wherein the restricted process is limited to reading data from the file and writing data into the converted file.

* * * * *